United States Patent [19]
Christenson et al.

[11] 4,167,729
[45] Sep. 11, 1979

[54] APPARATUS FOR OBTAINING MULTI-SPECTRAL SIGNATURES

[75] Inventors: Dempster S. Christenson, Pittsburgh, Pa.; Michael F. Gordon, Sunnyvale, Calif.; Roland D. Kistler, Plymouth, Mich.; Frank J. Kriegler, Ann Arbor, Mich.; Seymour R. Lampert, Ann Arbor, Mich.; Robert E. Marshall, Ann Arbor, Mich.; Rowland H. McLaughlin, Ann Arbor, Mich.; Vernon H. Smith, Ann Arbor, Mich.

[73] Assignee: Environmental Research Institute of Michigan, Ann Arbor, Mich.

[21] Appl. No.: 910,379

[22] Filed: May 30, 1978

Related U.S. Application Data

[63] Continuation of Ser. No. 696,028, Jun. 14, 1976, abandoned.

[51] Int. Cl.² .............................................. G06K 9/00
[52] U.S. Cl. ............... 340/146.3 AH; 340/146.3 AC; 340/146.3 AQ; 364/516; 340/709
[58] Field of Search ......... 178/18; 340/324 R, 324 A, 340/146.3 AE, 146.3 R, 146.3 AH, 146.3 AQ, 146.3 Q; 250/202; 318/577, 578; 364/514–517, 521, 410

[56] References Cited

U.S. PATENT DOCUMENTS

| | | | |
|---|---|---|---|
| 3,610,935 | 10/1971 | Von Voros | 250/202 |
| 3,801,741 | 4/1974 | Ablett | 340/324 A |
| 3,868,555 | 2/1975 | Knowless | 250/202 |

OTHER PUBLICATIONS

Nagao et al, "An Interactive Picture Processing System on a Mini Computer", 2nd Int. Joint Conference on Pattern Rec., Aug., 1974, pp. 148–149.

Garvey et al, "On the Automatic Generation of Programs for Locating Objects in Office Scenes", 2nd Int. Joint Conf. on Pattern Rec., Aug., 1974, pp. 162–168.

Tenenbaum et al, "Isis: An Interactive Facility for Scene Analysis Research", 2nd Int. Joint Conference on Pattern Rec., Aug., 1974, pp. 123–125.

*Primary Examiner*—Leo H. Boudreau
*Attorney, Agent, or Firm*—Krass & Young

[57] ABSTRACT

A multispectral data classification system has an improved apparatus for the identification of training samples of multispectral image data useful in the computation of spectral signatures.

A set of multispectral image data is displayed on a user-interactive device in a two-dimensional ordered array. The training sample is defined by the sequential definition of the vertices of a polygon representing the training sample. A rectangle is closely superscribed about the polygon. The data elements within the rectangle are examined to determine if they are within the polygon.

The apparatus includes a multispectral data classification system incorporating a color, CRT display for displaying the set of data; a manually-operable trackball cursor interactive with the color, CRT display for defining the polygon and rectangle; an alphanumeric keyboard and monochrome CRT for providing communication between the operator and system; and a random access memory device.

12 Claims, 8 Drawing Figures

APPARATUS FOR OBTAINING MULTI-SPECTRAL SIGNATURES

This is a continuation, of application Ser. No. 696,028, filed June 14, 1976, and now abandoned.

INTRODUCTION

This invention relates to the multispectral scanning art and more particularly to improved apparatus for identifying distinct subsets of multispectral image data within a base set of data.

BACKGROUND OF THE INVENTION

Multispectral scanning has become an important practical application of radiometry theory. The technique applies the principle that since various types of matter can be characterized by their spectral signature, i.e., their energy emission curve over a broad range of frequencies, classification of a group of various subjects contained within a scene can be accomplished by remotely scanning the scene with a detector sensitive to emitted energy over a broad range of frequencies and comparing the detector output with the known spectral signatures of various subjects believed to be in the area.

This technique implies that known spectral signatures are available prior to the classification analysis. Spectral signatures are computed from and tested in comparison with training samples of multispectral image data selected on the basis of a priori information of a scanned scene, generally a photograph.

The identification of these training samples has in the past represented a bottleneck in the overall multispectral processing scheme. The specific limitation has been the requirement that the operator first display a set of data containing the training sample, then make individual identifications of the coordinates of each data element, and finally compile all of the coordinate identifications to define the training sample.

An objective of the present invention is to provide a method and apparatus for minimizing operator involvement in the training sample identification process, thus to expedite the overall processing scheme.

SUMMARY OF THE INVENTION

In accordance with the present invention, training samples of multispectral image data are extracted from a base of such data by displaying a set of the base data on a user-interactive device and having the operator define a polygonal representation of the training sample. The displayed data set is then systematically analyzed to determine which data elements are contained within the polygonal representation (training sample elements) and which are without (non-training sample elements).

The interactive display device is preferably a color, CRT display. The set of base data has at least one channel displayed in a two-dimensional ordered array that corresponds to the coordinate system of the scanned scene.

The operator is generally assisted in his identification of the training sample within the displayed data set by some ground truth information about the scanned scene, typically a photograph. On the basis of this information, he delineates the training sample by selecting the vertices of a polygon which is closely inscribed within the contours of the training sample. This may be accomplished by use of a track ball cursor interactive with the CRT display, where the position of the cursor point on the display is manually controlled by rotating the track ball.

Once having defined the polygon, the method of the present invention employs a two-part search for each data element to determine if it is contained within the polygon. First, the vertical coordinate of a data element is checked to determine if it falls within the vertical range of any two adjoining vertices. If so, then for those pair of adjoining vertices which satisfy the first test, the horizontal coordinate of the data element is compared with the polygon sides joining each of these pairs of vertices to see if it falls to the relative left of the polygon sides an odd number of times. If so, then the data element is, according to mathematical formulation, within the polygon.

The apparatus further includes means for two-way communication between the operator and system. In the illustrative embodiment of the invention these include an alphanumeric keyboard and a monochrome, CRT display. In addition, memory capability is provided by means of a random access storage device.

The invention has general applicability to the extraction of samples from any class of multivariate data that may be spatially represented in a two-dimensional ordered array. For a fuller appreciation of the invention, reference should be made to the following detailed description of a specific embodiment.

DETAILED DESCRIPTION OF THE SPECIFIC EMBODIMENT

Figure 1:
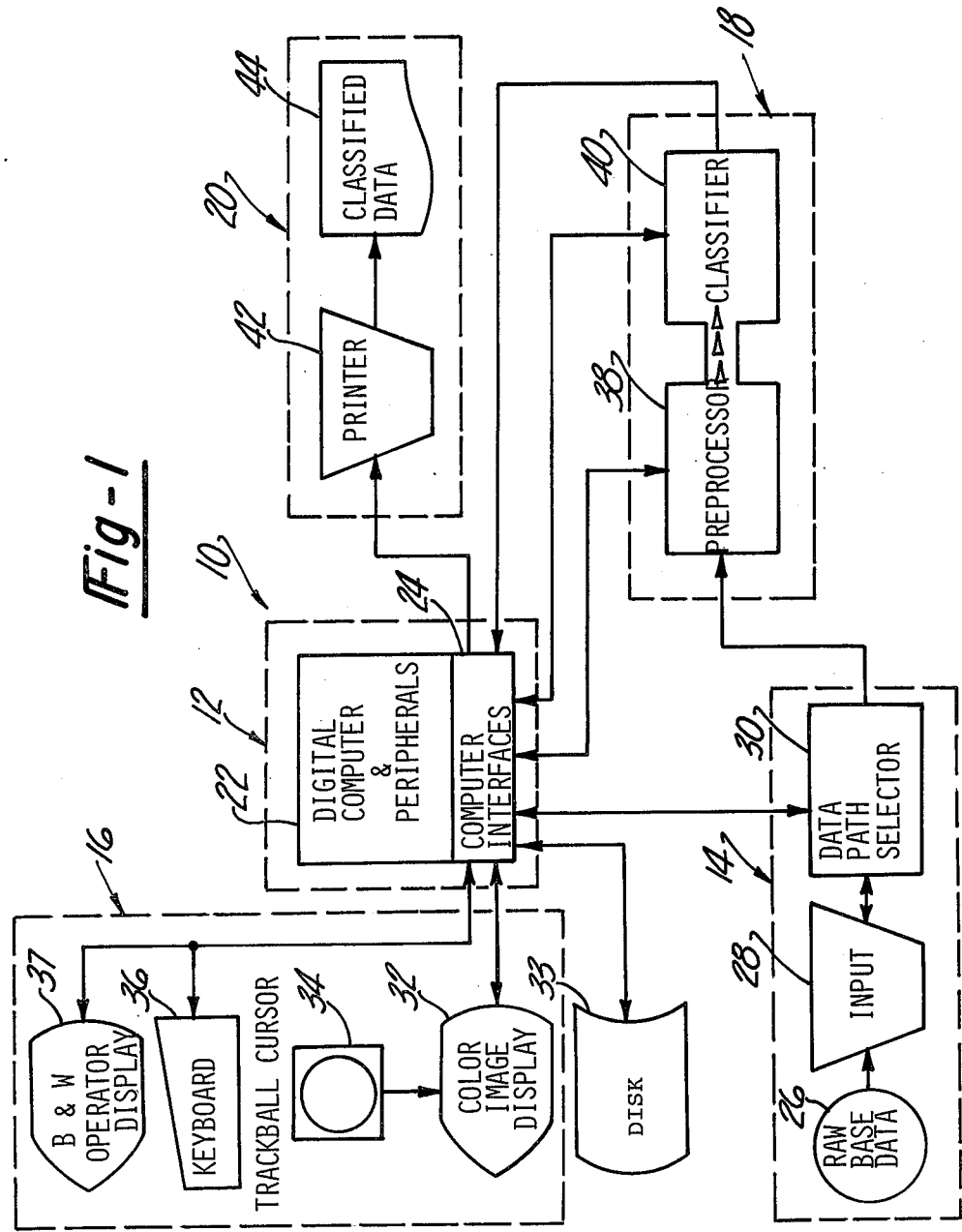
FIG. 1 is a schematic diagram of a multispectral image data processing system adapted for use with the present invention.

A multispectral image data processing system which incorporates the present invention and is representative of a class of data processing systems to which the present invention is adaptable, is shown generally at 10 in FIG. 1. The system 10, exclusive of the present invention, is taught in full detail in National Aeronautics Space Administration Report No. NASA CR-132463, dated August 1974, Volumes 1, 2 and 3. This report is unclassified and is accessible to the general public.

In overview, the multispectral image data processing system 10 is an assembly of several subsystems, which, in effect, cooperate to process raw, unclassified multispectral image data from a scanned scene into a classified representation of the scene on a hard copy, color output or other suitable display medium.

A central processing (CP) subsystem, shown generally at 12, is responsible for monitoring and executing system tasks. CP sybsystem 12 includes a general-purpose digital computer and necessary peripherals 22, including core and disk memory units. Also included in CP subsystem 12 are the interfaces 24 necessary to bring peripheral equipment into communication with the digital computer.

Multispectral image data is input in raw form to the system through a data input subsystem, shown generally at 14. The raw input data, represented by symbol 26, is typically stored on magnetic tape; either analog tape, high density digital tape, or computer compatible tape. The data appears on the tape in a sequence of discrete elements; each representative of an elemental portion of a scene. Each data element takes the form of an n×1 vector, where n represents the number of spectral channels used. Accordingly, the ith position in the vector represents the signal strength in the ith channel. An input unit 28 reads in the data 26; its form is dependent upon the particular type of input medium selected. From input unit 28 the data flows to a data path selector 30, a special-purpose hardware unit designed to gate the flow of data among alternative paths depending on the processing function to be performed. For repetitive use the data is put on a random access storage device (DISK) 33 via computer interface 24, but can be routed directly to the preprocessor 38.

A user-interactive subsystem, shown generally at 16, provides for operator participation in the processing sequence. Such participation is important primarily in the identification of training samples and test areas for the computation and testing of spectral signatures. The subsystem 16 includes a three color, cathode ray tube (CRT) display 32 for displaying multispectral image data, a track ball cursor 34 for delineating subsets of data displayed on the CRT 32 and an alphanumeric keyboard 36 and monochrome, CRT display 37 which together provide for communication between the operator and the central processing subsystem 12. Details of the apparatus and operation of the user-interactive subsystem 16 which relate to the present invention will hereinafter more fully be described.

Multispectral image data is classified through a data processing pipeline subsystem, shown generally at 18, which includes a preprocessor 38 and a classifier 40; both of which are special purpose hardware units whose functions are briefly described as follows.

The function of the preprocessor 38 is to condition the raw data in any of a number of ways preparatory to classification. Various methods of conditioning include: Signal conditioning to scale the raw data into an acceptable dynamic range; correcting for scanned-angle error with additive and/or multiplicative operations; linearly transforming data vectors for dimension reduction; and ratioing of channels. These operations will, in many instances, enchance classification accuracy without materially impairing information content.

The output of the preprocessor 38 flows directly to the input of the classifier 40 which performs the actual classification of the data into categories. The classifier 40 preferably performs a maximum-likelihood decision computation that assumes a multimodal Gaussian multivariate distribution.

Classified data is output from the system 10 through a data output subsystem, shown generally at 20, which includes a printer 42 for the production of a hard copy record of the classified data, as represented by symbol 44.

Figure 2:
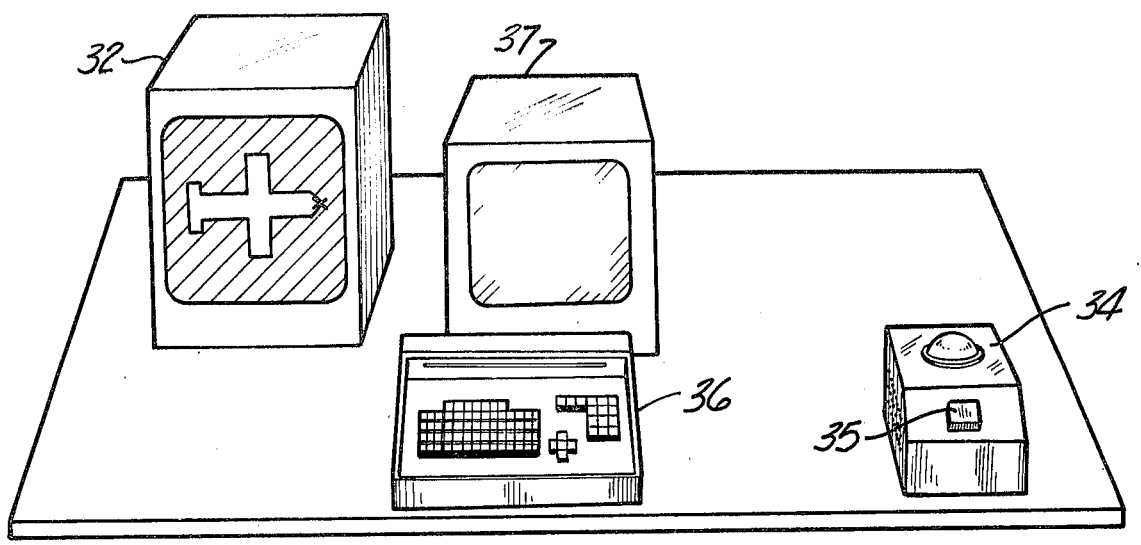
FIG. 2 is a pictorial representation of the operator control hardware of the system of FIG. 1.

With reference to FIG. 2, the user-interactive subsystem 16 is to determine the spectral signatures of subject classes that are believed to exist within the body of multispectral image data representative of that scene. Signature computation is necessarily a man/machine interactive process. In broad outline, the operator must be able to call up from storage and display sets of data which, based on a priori information available to him, are believed to contain training samples of subject classes. He must discriminate between training and non-training sample areas in the data display. The data elements included in the training sample areas must then be assembled for subsequent spectral analysis.

To facilitate these tasks, the user-interactive subsystem 16 of the present invention includes the three color, CRT display 32, the track ball cursor 34 and the alphanumeric keyboard 36 and monochrome, CRT display 37. Each of these units is commercially available under the trademark RAMTEK.

The three color, CRT 32 provides the basic means of displaying imagery. The display uses MOS storage for screen refresh and allows display of 512 by 512 elements on the Screen at 5 bits (plus an overlay bit) per scene element. Each five bit element may be translated into 3 four bit signals by table-look-up memories. The overlay channel is employed to designate points as a cursor or to indicate boundary locations in designating fields for analysis.

Operator control is through the track ball cursor 34 and alphanumeric keyboard 36. The track ball cursor 34 controls the position of the cursor bit on the screen of the CRT display 32. Once the cursor bit is moved to the desired position, the operator can signal the same to the system by pressing the "ENTER" button 35 on the track ball cursor 34. The alphanumeric keyboard 36 and monochrome, CRT 37 allow two-way communication between the operator and central processing subsystem 12.

Figure 3:
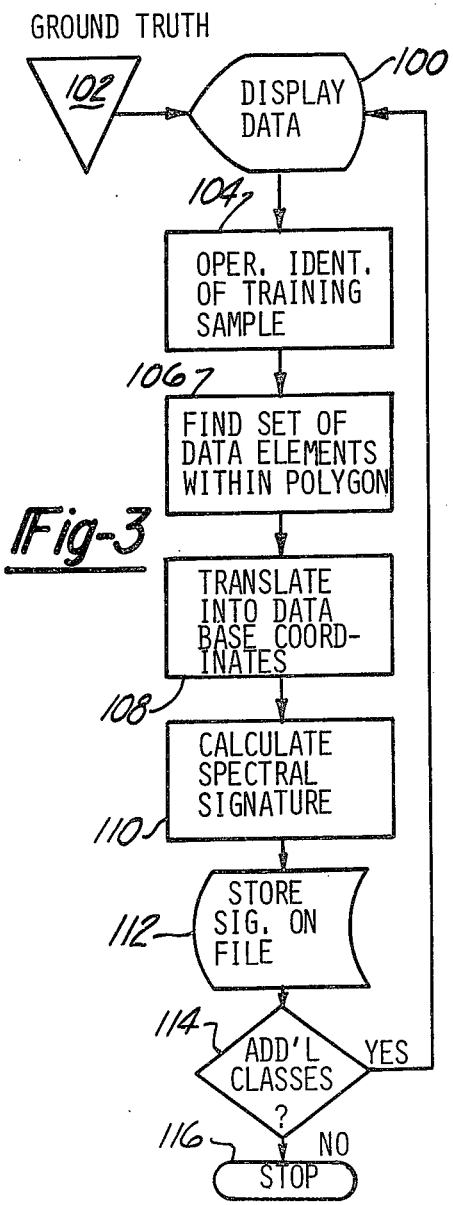
FIG. 3 is a flowcharted representation of the steps involved in computing a spectral signature for a subject class in accordance with the method of the present invention.

A typical training sequence in the computation of a spectral signature is represented by FIG. 3. The sequence starts out with the assumption that a base of digitized multispectral image data is on storage in the random access storage device 33. The base data is representative of a scene scanned from a remote, moving object, generally an aircraft or Earth satellite. The data on file is stored in a two-dimensional format, that is, scan line by scan line and picture element by picture element (pixel), which correlate to reference positions in the scanned scene.

In Step 100, the operator calls up from random access storage device 33 and displays on the CRT 32 a set of the base of multispectral image data which he believes to contain a subject class. The data set is displayed in a two-dimensional ordered array. The data set selection is typically based on a priori information about the scanned scene, e.g., a ground truth photograph, as is represented by offline file 102.

Figure 7:
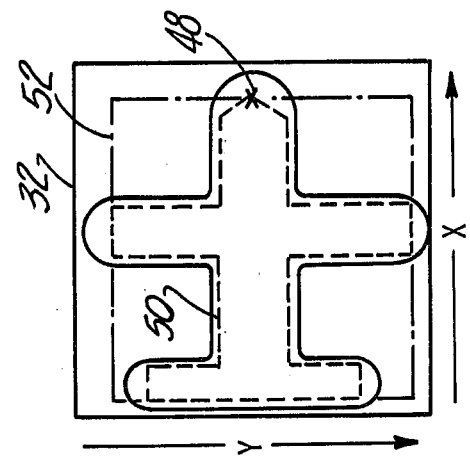
FIG. 7 is a pictorial representation of the screen of a cathode ray tube display of multispectral image data having a subject class defined in accordance with the present invention.

In Step 104 the operator identifies the training sample on the screen of the CRT display 32. More specifically, in accordance with the present invention, the operator delineates the training sample data elements from the balance of data elements by defining a polygon representing the training sample. For example, the dashed line polygon 50 shown on the screen of the CRT display 32 in FIG. 7 represents an airplane.

The polygon is defined by the sequential definition of its vertices. In the present invention this is effected as follows. The operator moves the track ball cursor 34 so that the cursor point 48 lies over a vertex on the screen of the CRT display 32. The identification of this vertex is communicated to the system by pressing the enter button 35 on the track ball cursor 34. The cursor point 48 is then moved to the next adjoining vertex and its identification is entered in a like fashion. This sequence is repeated for every vertex. When the last vertex has been entered, pressing the enter button 35 again without moving the cursor closes the polygon.

Next, as indicated by step 106, it is the task of the system software to identify coordinates of the data element contained within the polygon. For this purpose, the system employs the scanning routine represented in FIGS. 4 through 6.

Figure 4:
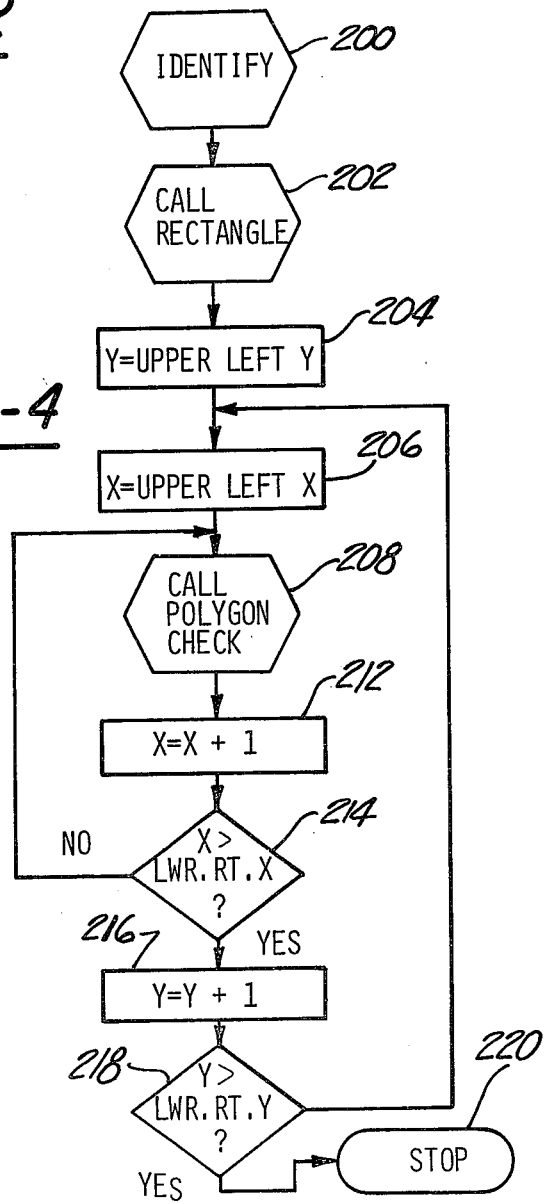
FIGS. 4–6 are flowcharted representations of special routines used to identify a subject class within a display of multispectral image data.

The main routine for identifying data elements within the polygon is entitled IDENTIFY, and is shown in flowchart form in FIG. 4. Two subroutines which are called by IDENTIFY are entitled RECTANGLE and POLYGON CHECK, and are shown in flowchart form in FIGS. 5 and 6.

Upon entering IDENTIFY at 200 in FIG. 4, the subroutine RECTANGLE is immediately called in step 202. The function of the subroutine RECTANGLE is to superscribe a minimum area rectangle around the polygon, as illustrated by the long-short dashed line rectangle 52 around polygon 50 in FIG. 7. Only data elements contained within this rectangle will be analyzed in a step to enhance program efficiency.

Figure 5:
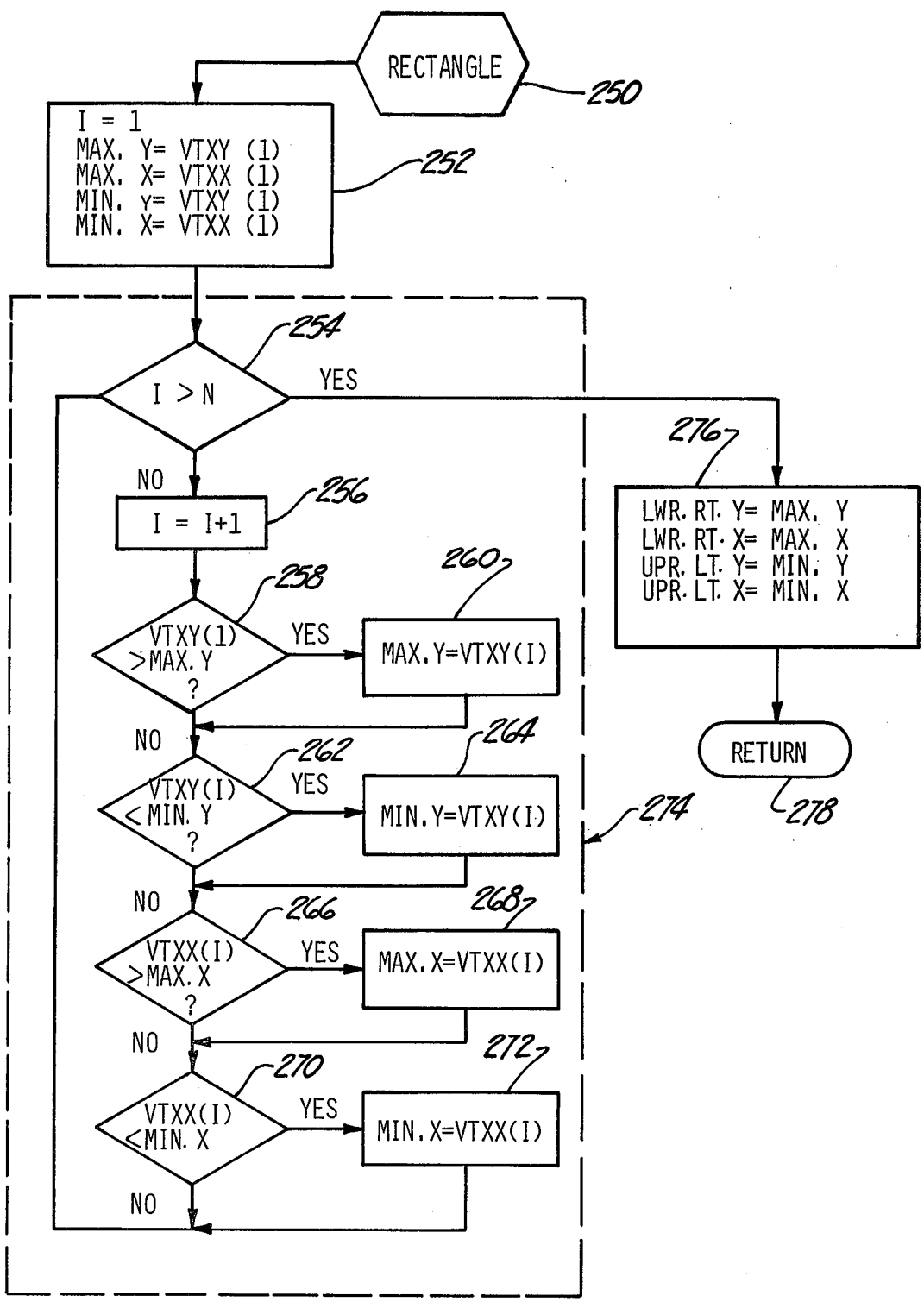

Referring to FIG. 5, subroutine RECTANGLE is entered through step 250. The routine uses several variables which are defined as follows: N=the number of polygon vertices; I=a dummy variable used for counting iterations; VTXY is an N-dimensional vector whose ith element is the Y-coordinate value for the ith polygon vertex; VTXX is an N-dimensional vector whose ith element is the X-coordinate value for ith polygon vertex; MAXY is equal to the largest element in the VTXY vector; MINY is equal to the smallest element in the VTXY vector; MAXX is equal to the largest element in the VTXX vector; MINX is equal to the smallest element in the VTXX vector.

Basically, RECTANGLE is an iterative sorting routine which examines each polygon vertex to find the extreme X and Y coordinates. In Step 252 several variables are initialized; I is set to 1, and MAXY, MINY, MAXX AND MINX are all set to values corresponding to the coordinates of the first polygon vertex.

The program then enters an iterative sorting loop, shown generally at 274. In decision 254, I is compared to N to test if the loop has been completed.

If I is not greater than N, the "No" branch of decision 254 is followed. Step 256 increments I by one unit. The sort then begins.

Decision 258 compares VTXY (I) with the current value of MAXY. If greater, the "Yes" branch of Decision 258 is followed to Step 260 where MAXY is set equal to VTXY(I). If not greater, the "No" branch of Decision 258 is followed and MAXY is left unchanged.

Decision 262 compares VTXY (I) with the current value for MINY. If smaller, the "Yes" branch of Decision 262 is followed to Step 264 where MINY is set equal to VTXY (I). If not smaller, the "No" branch of Decision 262 is followed and MINY is left unchanged.

Decision 266 compares VTXX (I) with the current value for MAXX. If greater, the "Yes" branch of Decision 266 is followed to Step 268 where MAXX is set equal to VTXX (I). If not greater, the "No" branch of Decision 266 is followed and MAXX is left unchanged.

Decision 270 compares VTXX (I) with the current value for MINX. If smaller, the "Yes" branch of Decision 270 is followed to Step 272 where MINX is set equal to VTXX (I). If not smaller, the "No" branch of Decision 270 is followed to the reentry of Decision 254, and MINX is left unchanged.

When I becomes greater than N, i.e., when all polygon vertices have been examined, the "Yes" branch of Decision 254 is followed. At this point the four corners of a rectangle superscribing the polygon have been defined. In Step 276, four variables characterizing the rectangle in terms of the (X,Y) coordinates of two diagonally opposite corners are given values. LOWER RIGHT Y is set equal to MAXY, LOWER RIGHT X is set equal to MAXX, UPPER LEFT Y is set equal to MINY, and, UPPER LEFT X is set equal to MINX. In Step 278 the program reenters the calling routine IDENTIFY.

Referring again to FIG. 4, having once identified the superscribing rectangle, each data element in the rectangle is examined to determine if it is contained with the polygon. Each data element is identified by its X and Y coordinates; X relating to the lateral position, and Y relating to the vertical position in the two-dimensional ordered array of data elements.

The examination begins with the numerically lowest X and Y coordinates in the rectangle, which is the upper left hand corner of the rectangle. Accordingly, in Step 204, Y is set equal to UPPER LEFT Y, and in Step 206, X is set equal to UPPER LEFT X. In Step 208 the subroutine POLYGON CHECK is called to determine if this data element is contained within the polygon.

Figure 6:
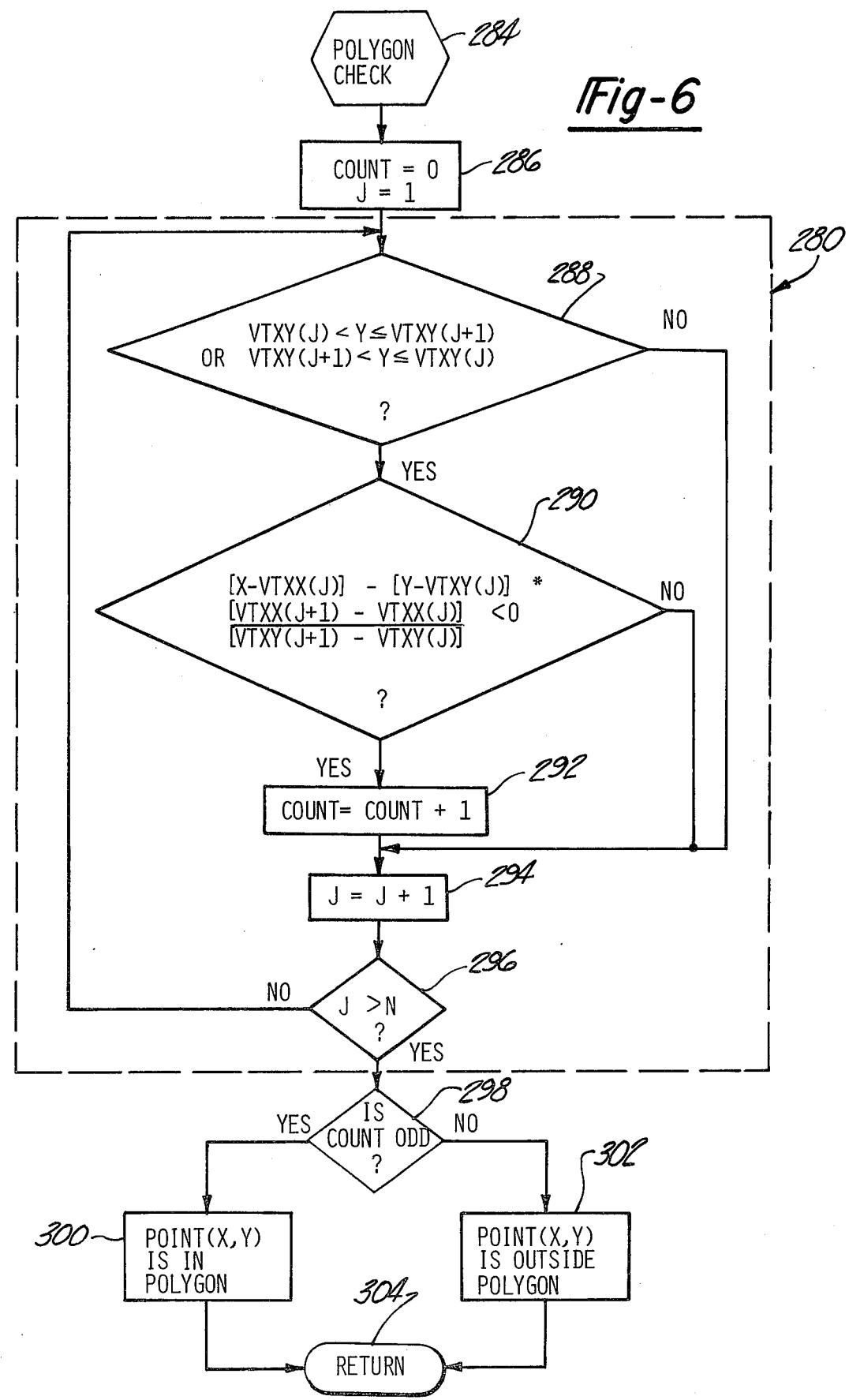

Referring to FIG. 6, POLYGON CHECK is entered at block 284. The only new variables introduced in this routine are dummy counting variables, COUNT and J, which are initialized in Step 286 to O and 1, respectively.

The program then enters an iterative examining routine, shown generally at 280, which requires N passes, where N equals the number of vertices. In overview, each data element is first simply tested at 288 to determine if it is vertically located between the Y coordinates of the J th and J+1 st vertices, i.e., is it "beside" the polygon edge between these vertices. A point horizontally beside a vertex would be considered beside the lower edge only, by the choice of strict and non-strict inequalities. If so, a more elaborate evaluation at 290 determines whether the point is to the left of or on the polygon edge between the Jth and J+1 st vertices. If so, the variable COUNT is incremented by one unit at 292. If, at the end of the iterative loop, COUNT is odd at 298, then the data element is known to be to the left of an odd number of edges and hence contained within the polygon, and vice versa if COUNT is even.

In greater detail, iterative examining routine 280 is entered with Decision 288 which asks if the Y-coordinate value of the data element is mediate in value between the Y-coordinates of the J th and J+1 st polygon vertices, or equal in value to the greater Y-coordinate vertex. If not, it is clear that the data element is not horizontally "beside" the polygon edge defined by having as its end points the J th and J+1 st vertices, and the "No" branch of Decision 288 is followed. It should be noted that this same inequality test has simultaneously ensured that the polygon edge is not horizontal.

If Decision 288 is satisfied, the "Yes" branch is followed to Decision 290, where the X and Y-coordinate values of the data element are examined in conjunction with the same two polygon vertices to see if the data element is on or to the left of the polygon edge. The difference between the X-coordinate value of the data element and the X-coordinate value of the J th vertex is compared to the difference between the Y-coordinate value of the J th vertex scaled by the inverse of the slope between the J th and the J+1 st vertices, yielding the signed horizontal displacement of the data element from the edge. If the comparision shows the data element is strictly to the right of the edge, the "No" branch of Decision 290 is followed. If Decision 290 is satisfied and the "Yes" branch is followed, then in Step 292 COUNT is incremented by one unit.

In Step 294, J, the iterative loop counter, is incremented by one unit. Note that the "No" branches of Decisions 288 and 290 both flow into Step 294 when the conditions posed by those decisions are not satisfied.

In Decision 296, the current value of J is checked against N, the number of vertices. If J does not exceed N, the "No" branch is followed and the program re-enters Decision 288 for another iteration. If J-exceeds N, iterative examining routine 280 has been completed for this data element and the "Yes" branch is followed.

In Decision 298 COUNT is tested to determine whether it is even or odd. If COUNT is odd, i.e., the data element is to the left of an odd number of non-horizontal polygon edges, it represents the condition that the data element is within the polygon. In this event, the "Yes" branch of Decision 298 is followed to Step 300 where this fact is registered and stored. If COUNT is even, it represents the condition that the data element is not within the polygon. In this event, the "No" branch of Decision 208 is followed to Step 302 where this fact is registered and stored.

Both Steps 300 and 302 flow to Step 304 where program control is returned to the calling routine IDENTIFY.

Referring again to FIG. 4, the IDENTIFY routine is re-entered at Step 208. In Step 212, X is incremented by one unit, which graphically corresponds to moving to the next columnar position in this row of data elements. In Decision 214, X is tested against LOWER RIGHT X to see if this row of data elements has been completed. If not, the "No" branch of Decision 214 is followed and the sequence of Steps 208 through 212 is repeated as heretofore described. If the row is completed, the "Yes" branch of Decision 214 is followed.

In Step 216, Y is incremented by one unit, which corresponds graphically to advancing to the next succeeding row. In Decision 218, Y is tested against LOWER RIGHT Y to determine if all the rows of data elements in the superscribing rectangle have been completed.

If not, the "No" branch of Decision 218 is followed to the re-entry of Step 206 where X is reset to UPPER LEFT X, which corresponds graphically to starting back to the first columnar position in the row. Thereafter, Steps and Decisions 206 through 218 are repeated in the manner heretofore described.

If the condition posed by Decision 218 is satisfied, the "Yes" branch is followed. In Step 220 the routine IDENTIFY is terminated.

Referring again to FIG. 3, in Step 108 the data elements identified to the polygonal training sample are translated from the display coordinate system to the random access file coordinate system. This may be accomplished through a file header which functions as a look-up-table for accessing data element coordinates on the random access device.

In Step 110, the spectral signature for this subject class, e.g., in this illustration an airplane, is computed. In computing a signature the operator first decides if he wants to include any additional training sets of a like type that may be available. Next he selects the channels to be used in the computations. Also he specifies an allowable number of standard deviations from the mean data value for each channel to serve as a criterion for excluding spurious data elements from the computations. With this information, a signature is computed. In Step 112, the signature is stored on file.

Decision 114 asks if there are additional classes for which signatures are to be obtained. If yes, the process of signature determination is repeated. If no, this phase of the overall processing sequence is completed, as indicated by terminal 116.

Once the spectral signatures of the subject classes have been obtained, the base of multispectral image data may be classified and displayed by the multispectral image data processor 10 which was described in connection with FIG. 1.

The invention has further utility in the extraction of test areas from a base of multispectral image data. The test areas differ from the training samples only to the extent that they are extracted after the derivation of spectral signatures and are used to test the classification accuracy of those signatures.

Figure 8:
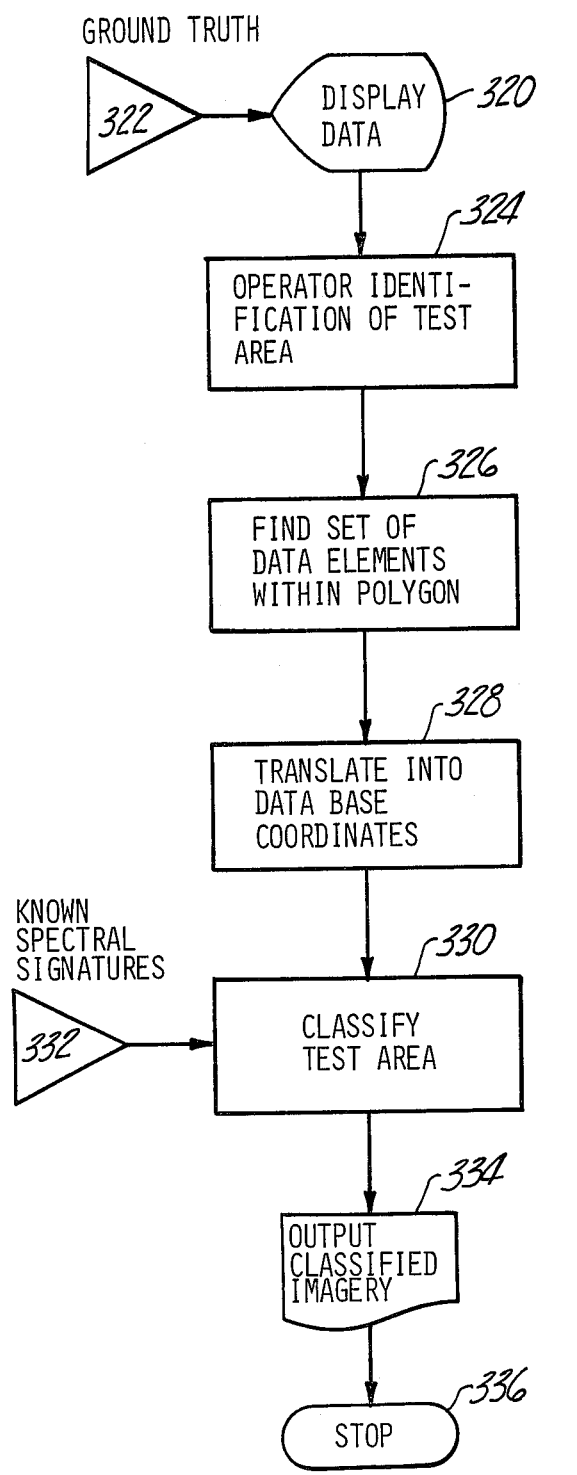
FIG. 8 is a flowcharted representation of the steps involved in extracting a test area of multispectral image data for use in testing the accuracy of spectral signatures already computed.

FIG. 8 sets forth the steps for the overall testing procedure. The first four steps denominated 320, 324, 326 and 328 in FIG. 8 are in direct parallel to Steps 100, 104, 106 and 108 in the training sample extraction process as was hereinbefore discussed in connecton with FIG. 3. Therefore, they will only be discussed briefly as follows:

Step 320 the operator displays a set from the base of multispectral image data which he believes, based on ground truth information as represented by offline file 322, to contain the test area of interest. In Step 324 the operator uses the polygon identification method of the present invention to delineate the test area from the balance of the display data. In Step 326 the display data is examined to determine which elements are contained within the polygon and which are without the polygon. In Step 328 those data elements identified to the polygon are translated back into the data base coordinates.

Once the test area has been extracted it is subject to a classification procedure in Step 330. The known spectral signatures, as represented by offline file 332, are used to classify the test area. In Step 334 the results of the classification step is output onto a visual display medium for a subsequent evaluation of the accuracy of the signatures. The sequence terminates with the "STOP" instruction of Step 336.

As will be apparent to those skilled in the art the invention has further utility beyond the classification of multispectral image data. The concept of the present invention may be generalized to apply to the extraction of data samples from any class of multivariate data that may be spacially represented in a two-dimensional ordered array. Widely varying embodiments of the invention will suggest themselves to those having skill in the art without departing from the scope and essence of the following claims.

The embodiments of the invention in which an exclusive property or privilege is claimed are defined as follows:

1. In a system for the classification of a body of multispectral data vectors which represents a multivariate scene having a plurality of subject classes, the system having means for determining the spectral signature of each subject class and means for classifying the body of multispectral data vectors in accordance with the spectral signatures, the improvement comprising the inclusion in the means for determining the spectral signature of each subject class of:
   storage means for storing the body of multispectral data vectors;
   display means for displaying a data set from the body of data vectors which contains a subject class in a format forming a two-dimensional, ordered array;
   operator control means responsive to an operator identification of the vertices of a polygon representing a subject class contained within a displayed set of data vectors;
   means for identifying data vectors contained within the polygon defind by the operator; and
   means for operating on data vectors identified as being contained within the polygon to compute a spectral signature.

2. The system as defined in claim 1, wherein the storage means includes a random access memory unit.

3. The system as defined in claim 1, wherein the display means includes a cathode ray tube display.

4. The system as defined in claim 3, wherein the operator control means includes a cursor in communication with the cathode ray tube display.

5. The system as defined in claim 4, wherein the cursor position on the cathode ray tube display is controlled by a manually-operable, interactive track ball.

6. In a system for classifying a body of multispectral data vectors which represents a multivariate scene, the system having means for determining the spectral signatures of training samples extracted from selected portions of said body and means for classifying each data vector in the body into one of a plurality of classes, with each class being defined by the spectral signature of one of the training samples, wherein the improvement comprises means for automatically extracting the training samples from the body of data vectors, said extraction means comprising:
   display means for displaying said body of data vectors in a two dimensional, ordered array;
   operator control means interactive with said display means for defining a polygon surrounding portions of said body on the display means thereby delineating a desired training sample;
   storage means for storing the location of the vertices of said polygon;
   means for automatically sequentially comparing the position of each data vector on the display means with the training sample area defined by the stored location of the vertices of the polygon; and
   means for providing data associated with only those data vectors within the polygon to said signature determining means wherein the spectral signature of the training sample is determined from those selected data vectors, said training sample defining one of a plurality of classes against which the multispectural signatures of all of the base data vectors can be compared for classification.

7. The improvement of claim 6 wherein said operator control means includes means for manually positioning a cursor on the display means for locating the vertices of said polygon.

8. The improvement of claim 7 wherein said cursor is positioned on the display means by manually rotating a track ball in the desired direction, and wherein an electrical signal coupled to said storage means provides an indication of the location of the cursor on the display means.

9. The improvement of claim 8 wherein said control means connects adjoining vertices with a line on the display means thereby providing the edges of the polygon.

10. The improvement of claim 9 wherein said comparison means firstly compares the data vector with the vertical location of adjoining vertices to determine if it is located therebetween and if so, secondly, determines whether the data vector is to the left of the edge defined by said vertices whereby said data vector is within said polygon if it is to the left of an odd number of such polygon edges.

11. The improvement of claim 10 which further comprises:
   means cooperating with said control means for further defining a rectangle closely superscribing the polygon; and
   means for limiting the comparison of the displayed data vectors to those data vectors contained within the rectangle.

12. The improvement of claim 11 wherein said display means is a color cathode ray tube, with said body of data vectors being displayed on said display means in one color before training sample extraction, and wherein the finally classified data vectors are displayed on the display means as a multicolored representation, with each color corresponding to a particular multispectural class.

* * * * *